(12) United States Patent
Ishii

(10) Patent No.: US 11,252,318 B2
(45) Date of Patent: Feb. 15, 2022

(54) IMAGING APPARATUS, METHOD FOR CONTROLLING THE SAME AND STORAGE MEDIUM

(71) Applicant: CANON KABUSHIKI KAISHA, Tokyo (JP)

(72) Inventor: Takumi Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 18 days.

(21) Appl. No.: 16/556,749

(22) Filed: Aug. 30, 2019

(65) Prior Publication Data

US 2020/0084355 A1   Mar. 12, 2020

(30) Foreign Application Priority Data

Sep. 6, 2018 (JP) .............................. JP2018-167215

(51) Int. Cl.
| | |
|---|---|
| *H04N 5/225* | (2006.01) |
| *H04N 5/232* | (2006.01) |
| *G06T 7/50* | (2017.01) |
| *G06T 7/90* | (2017.01) |

(52) U.S. Cl.
CPC ............. *H04N 5/2259* (2013.01); *G06T 7/50* (2017.01); *G06T 7/90* (2017.01); *H04N 5/23216* (2013.01); *H04N 5/23219* (2013.01); *H04N 5/23258* (2013.01); *H04N 5/23296* (2013.01); *H04N 5/232125* (2018.08); *G06T 2207/30201* (2013.01)

(58) Field of Classification Search
CPC .... H04N 5/2251; H04N 5/2259; H04N 5/232; H04N 5/23203; H04N 5/232125; H04N 5/23216; H04N 5/23219; H04N 5/23241; H04N 5/23258; H04N 5/2328; H04N 5/23296; H04N 5/23299; G06T 7/50; G06T 7/90; G06T 2207/30201

See application file for complete search history.

(56) References Cited

U.S. PATENT DOCUMENTS

| | | | |
|---|---|---|---|
| 9,195,118 B2 | 11/2015 | Okamura et al. | |
| 9,594,290 B2 * | 3/2017 | Enomoto | ............... G03B 11/04 |
| 9,955,066 B2 | 4/2018 | Ugawa et al. | |

(Continued)

FOREIGN PATENT DOCUMENTS

| | | |
|---|---|---|
| CN | 103676074 A | 3/2014 |
| CN | 106210464 A | 12/2016 |

(Continued)

OTHER PUBLICATIONS

Apr. 13, 2021 Chinese Official Action in Chinese Patent Appln. No. 201910837424.6.

*Primary Examiner* — Lin Ye
*Assistant Examiner* — Chriss S Yoder, III
(74) *Attorney, Agent, or Firm* — Venable LLP

(57) ABSTRACT

An imaging apparatus comprises a change unit configured to, such that it is possible to visually recognize that a direction of an optical axis for imaging has been changed, change the direction of the optical axis for imaging; an instruction unit configured to give an instruction to shift to a non-imaging state; and a control unit configured to, in a case where the instruction unit instructs to shift to the non-imaging state, control the change unit so as to change the direction of the optical axis for imaging to a direction that visually indicates the non-imaging state.

19 Claims, 8 Drawing Sheets

(56) References Cited

U.S. PATENT DOCUMENTS

| | | | |
|---|---|---|---|
| 2002/0085844 A1* | 7/2002 | Tashiro | G08B 13/19632 |
| | | | 396/427 |
| 2012/0113263 A1* | 5/2012 | Cirker | H04N 5/2254 |
| | | | 348/151 |
| 2014/0301729 A1 | 10/2014 | Okamura et al. | |
| 2016/0353013 A1 | 12/2016 | Ugawa et al. | |

FOREIGN PATENT DOCUMENTS

| JP | 2014-212508 A | 11/2014 |
|---|---|---|
| JP | 6089320 B2 | 3/2017 |

* cited by examiner

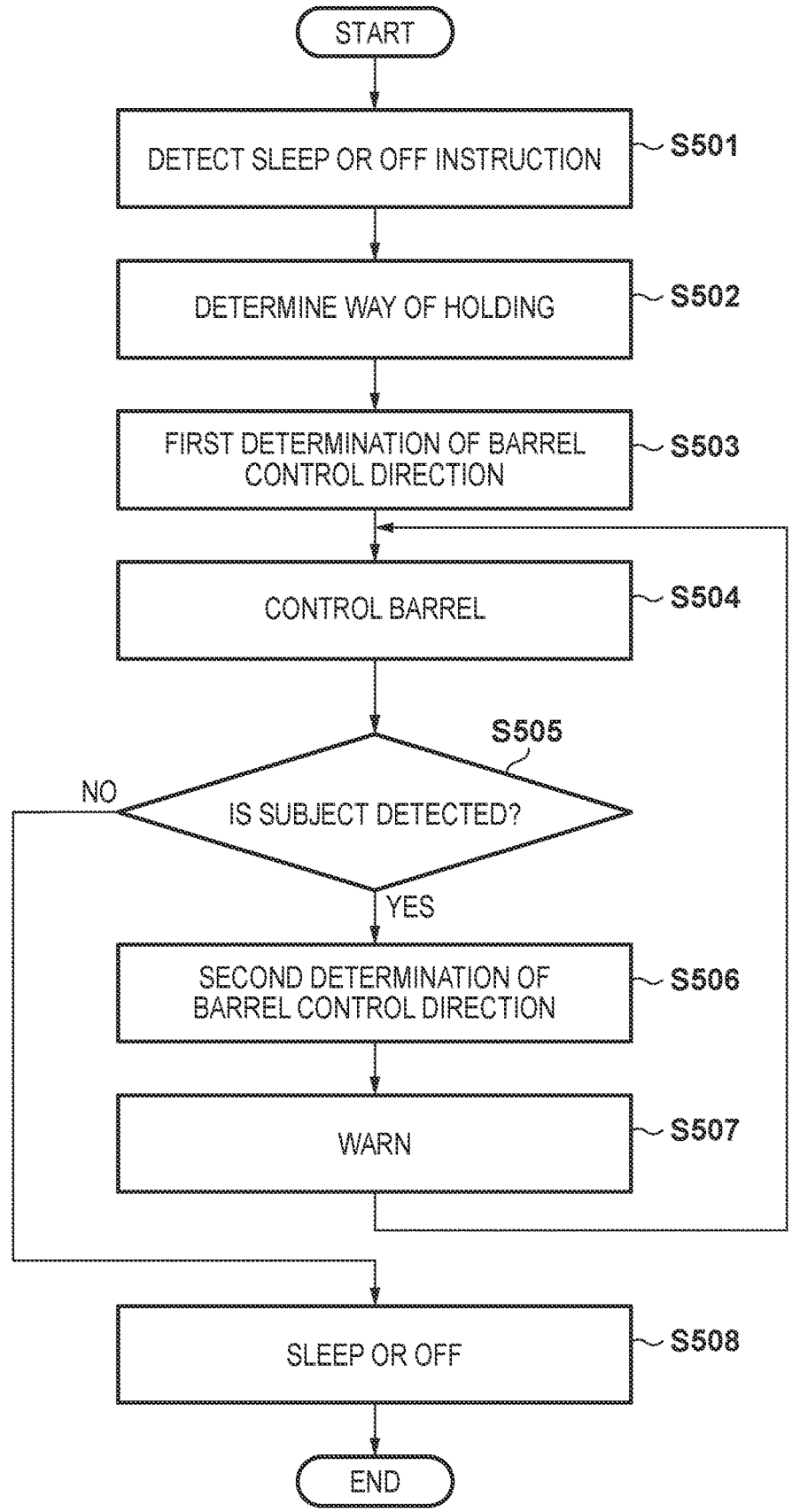

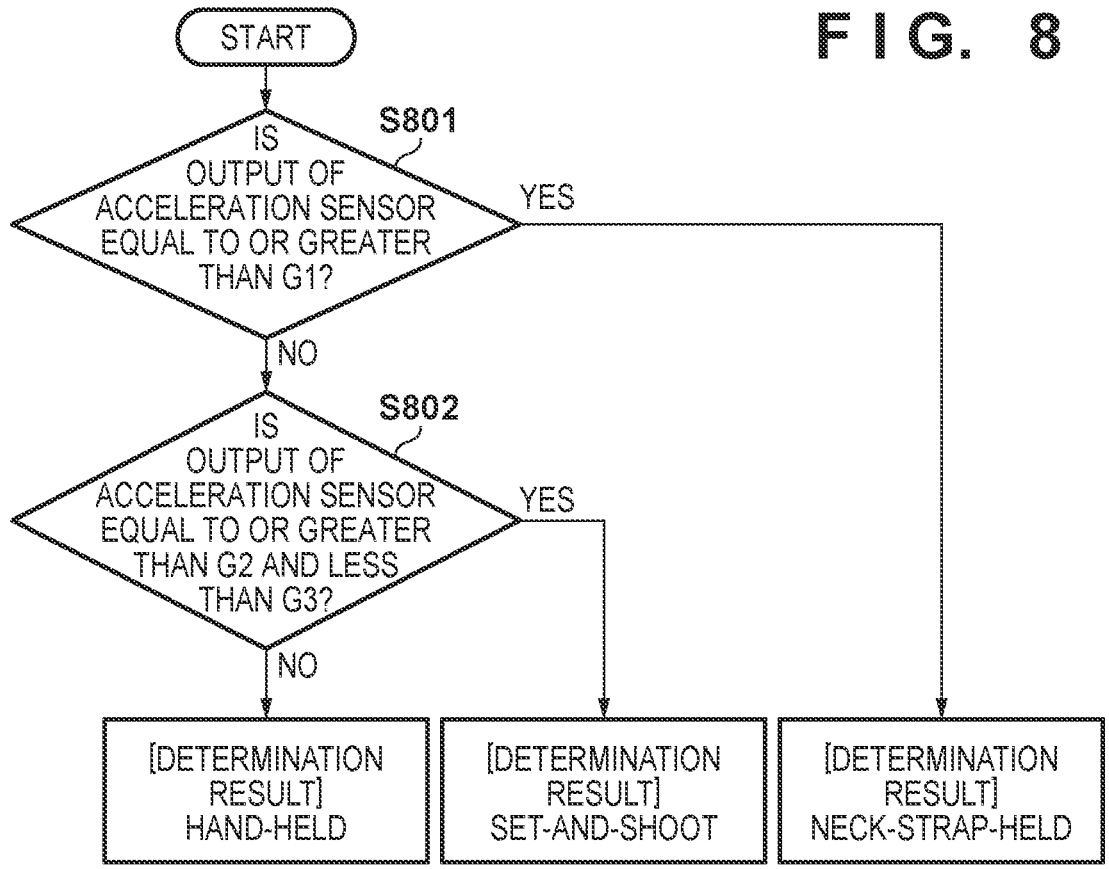

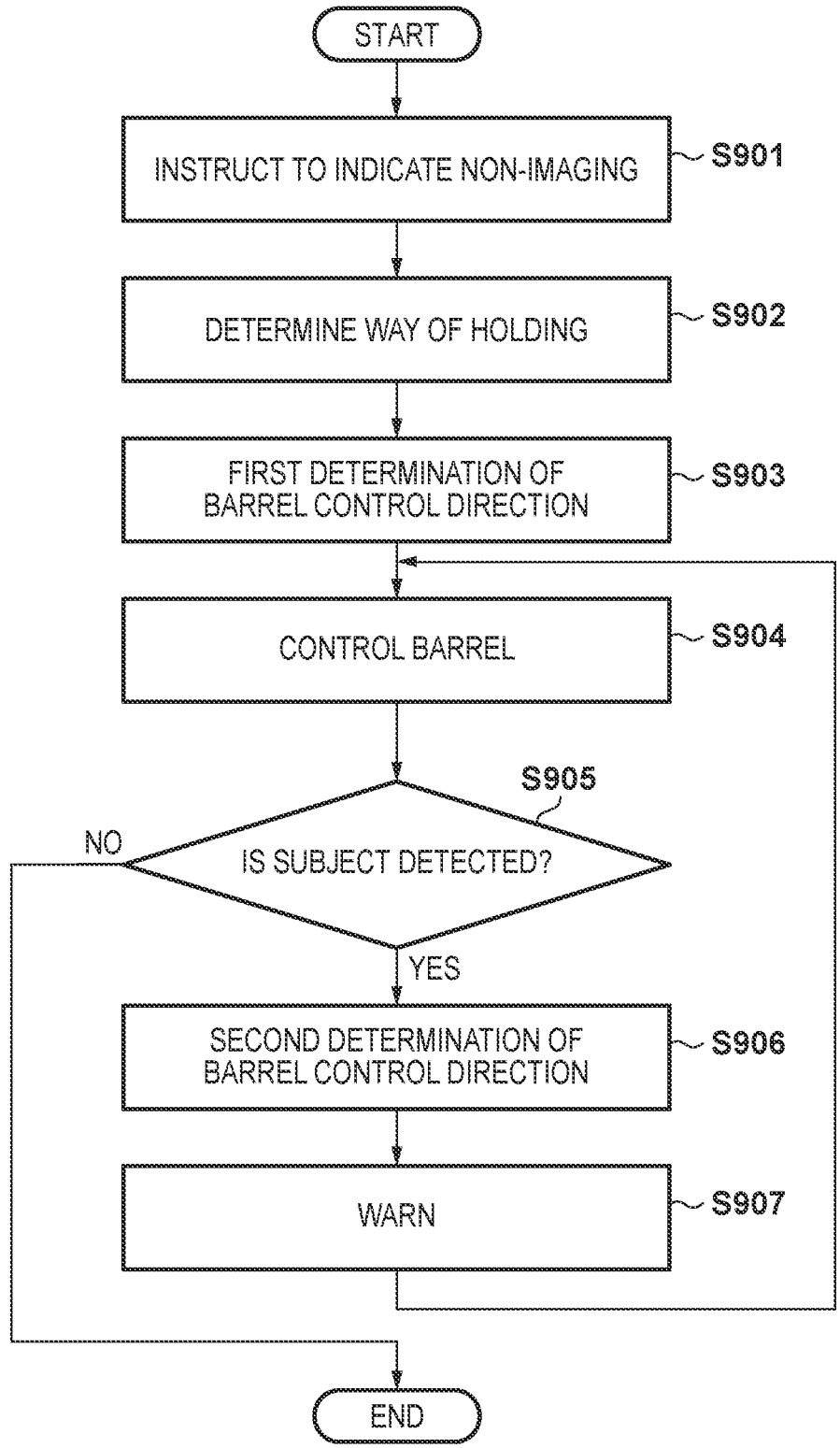

FIG. 11

| WAY OF HOLDING | SECOND BARREL CONTROL DIRECTION |
|---|---|
| HAND-HELD | PAN + DIRECTION → PAN - DIRECTION |
| SET-AND-SHOOT | PAN + DIRECTION → PAN - DIRECTION |
| NECK-STRAP-HELD | FLOOR DIRECTION → PAN + DIRECTION → PAN - DIRECTION | ns
IMAGING APPARATUS, METHOD FOR CONTROLLING THE SAME AND STORAGE MEDIUM

BACKGROUND OF THE INVENTION

Field of the Invention

The present invention relates to an imaging apparatus and a method for controlling the same.

Description of the Related Art

A lifelogging camera by which a user performs imaging periodically and continuously without giving an imaging instruction is known. A camera (hereinafter referred to as a "surveillance camera") which images the vicinity and performs surveillance and observation is also known.

In general, it is possible to completely shield light incidence on a mounted or attached lens by a lens cap or a cover when a camera does not perform imaging. This makes it possible to clearly indicate to those in the vicinity that imaging is not currently being performed when there is someone in the vicinity of the camera in a facility or public transportation system where imaging is prohibited, and thereby avoid trouble related to imaging.

However, in the cases of a lifelogging camera and a surveillance camera, it is common that a lens cap is not provided, a cover is not present, or even if one is present, complete shielding is not possible. Therefore, there is a possibility that people in the vicinity may be suspicious that they are the object of prohibited imaging, which may result in trouble.

With respect to such cameras, there are cameras in which a non-imaging state can be explicitly indicated to those in the vicinity of the camera by rotation of the lens and storing it within the camera when the camera is transitioned into a non-imaging state (Japanese Patent No. 6089320).

However, in the camera described in Japanese Patent No. 6089320, there was a problem in that the method could not be used for cameras where the lens could not be stored because it is premised upon the lens being storable within the camera.

SUMMARY OF THE INVENTION

The present invention has been made in view of the above-mentioned problems, and provides an imaging apparatus capable of clearly indicating a non-imaging state to the vicinity even in a case where a lens cannot be stored within a camera or the lens cannot be completely shielded.

According to a first aspect of the present invention, there is provided an imaging apparatus comprising: at least one processor or circuit configured to function as the following units; a change unit configured to, such that it is possible to visually recognize that a direction of an optical axis for imaging has been changed, change the direction of the optical axis for imaging; an instruction unit configured to give an instruction to shift to a non-imaging state; and a control unit configured to, in a case where the instruction unit gave the instruction to shift to the non-imaging state, control the change unit so as to change the direction of the optical axis for imaging to a direction that visually indicates the non-imaging state.

According to a second aspect of the present invention, there is provided a method for controlling an imaging apparatus that comprises at least one processor or circuit configured to function as a change unit configured to, such that it is possible to visually recognize that a direction of an optical axis for imaging has been changed, change the direction of the optical axis for imaging, the method comprising: giving an instruction to shift to a non-imaging state; and in a case where the shift to the non-imaging state is instructed, controlling the change unit so as to change the direction of the optical axis for imaging to a direction that visually indicates the non-imaging state.

Further features of the present invention will become apparent from the following description of exemplary embodiments with reference to the attached drawings.

BRIEF DESCRIPTION OF THE DRAWINGS

FIG. 5 is a flowchart for describing an example of control for indicating a non-imaging state.

FIG. 6 is a view that illustrates a first rotational direction of a barrel for each of respective ways in which the camera is held.

FIG. 7 is a view that illustrates a second rotational direction of a barrel for each way in which the camera is held.

FIG. 8 is a flowchart for describing details of a determination of the way in which the camera is held.

FIG. 9 is a flowchart for describing an example of control for indicating the non-imaging state.

FIG. 11 is a view that illustrates a variation of the second rotational direction of the barrel for each way in which the camera is held.

DESCRIPTION OF THE EMBODIMENTS

Explanation in detail is given below with reference to the attached drawings, regarding embodiments of the present invention.

<Camera Configuration>

Figure 1A:
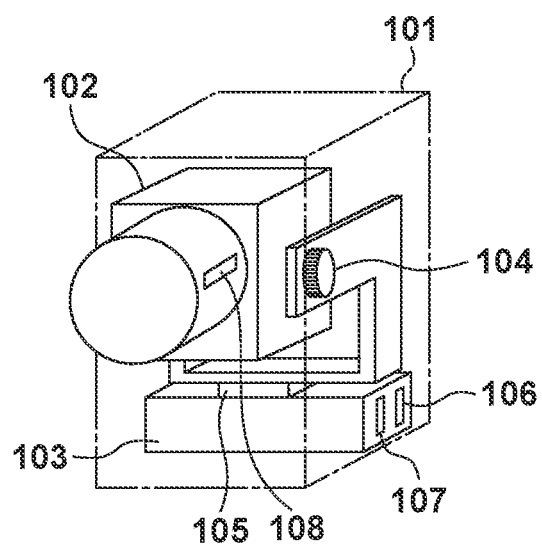
FIG. 1A and FIG. 1B are diagrams schematically illustrating an external appearance of a camera which is one embodiment of an imaging apparatus of the present invention.
Figure 1B:
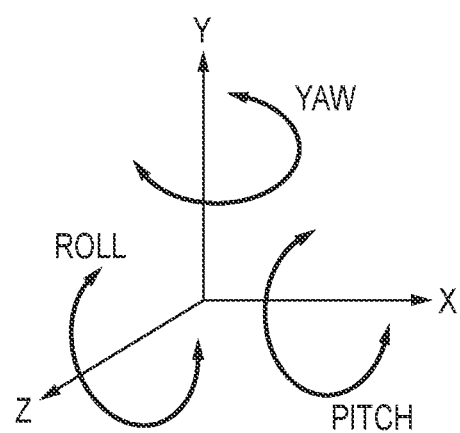

FIG. 1A and FIG. 1B are diagrams schematically illustrating an external appearance of a camera which is one embodiment of an imaging apparatus of the present invention. A camera 101 illustrated in FIG. 1A is provided with a power switch, an operation member by which it is possible to perform a camera operation, and the like. A barrel 102 integrally including an imaging lens group and an image pickup element as an optical imaging system for imaging of a subject image is movably attached to a fixed portion 103 of the camera 101. More specifically, the barrel 102 is attached to the fixed portion 103 via a tilt rotation unit 104 and a pan rotation unit 105, which are mechanisms that can be rotationally driven with respect to the fixed portion 103. The rotation units are not only rotationally controlled by a first control unit 223, which will be described later, but also are configured so that the user himself/herself can manually rotate the barrel 102. An accelerometer (acceleration detection unit) 108 for measuring acceleration applied to the barrel 102 is attached to the barrel 102.

The tilt rotation unit 104 includes a motor drive mechanism capable of rotationally driving the barrel 102 in the pitch direction illustrated in FIG. 1B, and the pan rotation unit 105 includes a motor drive mechanism capable of rotationally driving the barrel 102 in the yaw direction illustrated in FIG. 1B. That is, the camera 101 has a mechanism for rotating the barrel 102 in two axial directions. The axes illustrated in FIG. 1B are respectively defined with respect to the position of the fixed portion 103. An angular velocity meter 106 and an accelerometer 107 are disposed in the fixed portion 103 of the camera 101. Then, vibration of the camera 101 is detected on the basis of output signals of the angular velocity meter 106 and the accelerometer (acceleration detection unit) 107, and the tilt rotation unit 104 and the pan rotation unit 105 are rotationally driven, whereby the shake of the barrel 102 can be corrected or the tilt can be corrected. The angular velocity meter 106 and the accelerometer 107 also detect the movement of the camera based on a measurement result for a predetermined period. The accelerometer 107 is disposed in the fixed portion 103 so that acceleration in the direction of gravity (ground direction) is output as a positive value, and acceleration in a direction opposite to that of gravity (sky direction) is output as a negative value.

In the present embodiment, only the barrel 102 is described as rotatably drivable, but configuration may be such that only the camera 101 is rotatably drivable, or both the camera 101 and the barrel 102 are rotatably drivable.

Figure 2:
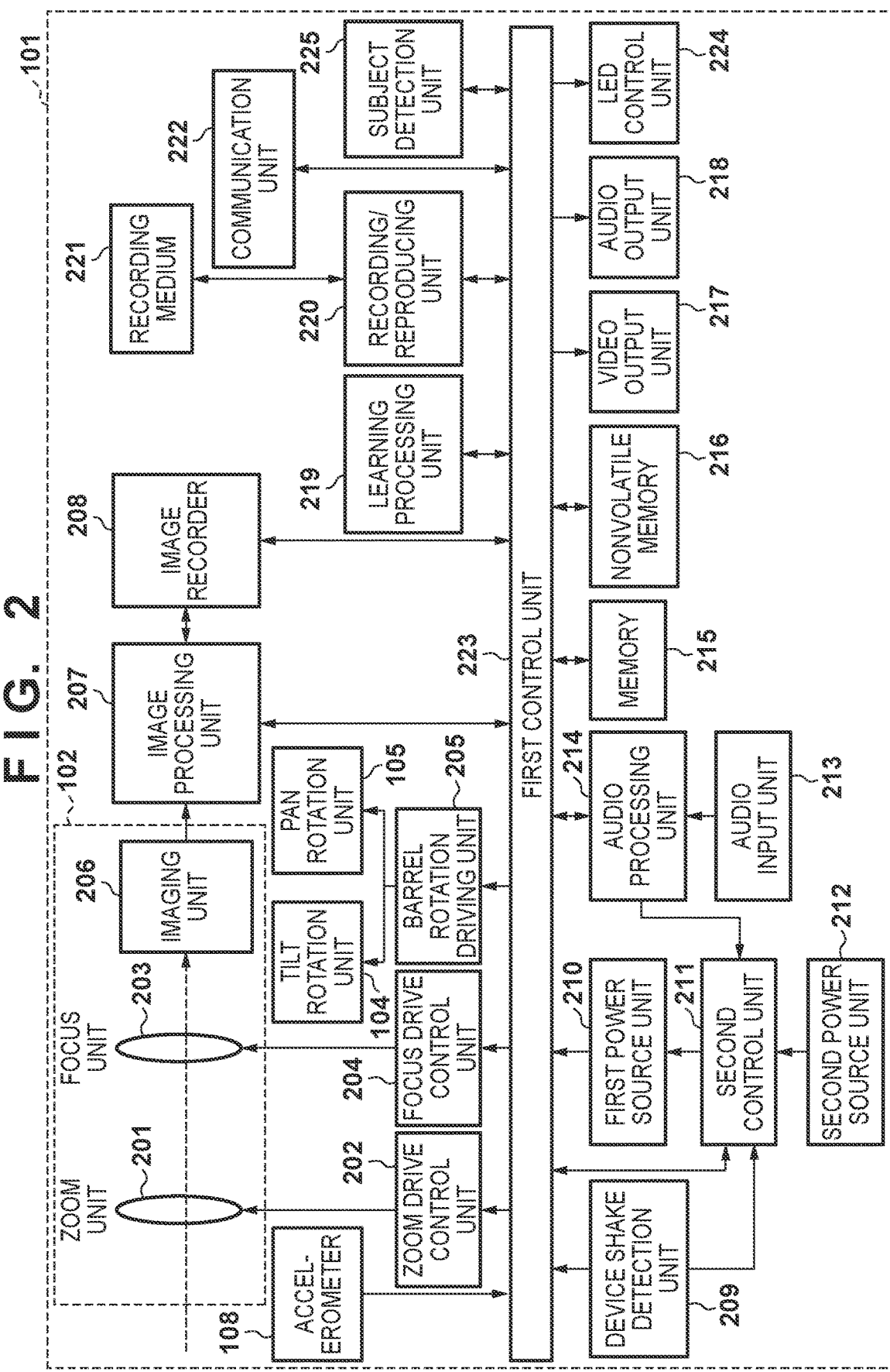
FIG. 2 is a block diagram that illustrates an overall configuration of the camera of one embodiment.

FIG. 2 is a block diagram illustrating the overall configuration of the camera 101 according to the present embodiment. In FIG. 2, the first control unit 223 includes, for example, a CPU (MPU), memories (DRAM and SRAM), and the like. In accordance with programs stored in a nonvolatile memory (EEPROM) 216, various processes are performed to control the blocks of the camera 101, and to control data transfer between the blocks. The nonvolatile memory 216 is an electrically erasable/recordable memory, and stores constants, programs, and the like for the operation of the first control unit 223 as described above.

In FIG. 2, a zoom unit 201 includes a zoom lens for performing scaling (magnification/reduction of an imaged subject image). A zoom drive control unit 202 drives and controls the zoom unit 201, and detects the focal length at that time. A focus unit 203 includes a focus lens for performing focus adjustment (focal point adjustment). A focus drive control unit 204 drives and controls the focus unit 203. An imaging unit 206 includes an image pickup element, receives light that enters through respective lenses, and outputs information of charges corresponding to amounts of light as an analog image signal to an image processing unit 207. The zoom unit 201, the focus unit 203, and the imaging unit 206 are disposed in the barrel 102.

The image processing unit 207 applies image processing such as distortion correction, white balance adjustment, and color interpolation processing to the digital image data obtained by A/D conversion of the analog image signal, and outputs the applied digital image data. The digital image data output from the image processing unit 207 is converted into a recording format such as a JPEG format by an image recorder 208, and is stored in a memory 215, or transmitted to a video output unit 217, which will be described later.

A barrel rotation driving unit 205 drives the tilt rotation unit 104 and the pan rotation unit 105 to rotate the barrel 102 in a tilt direction and a pan direction. A device shake detection unit 209 includes an angular velocity meter (gyro sensor) 106 for detecting angular velocities in three axial directions of the camera 101, and an accelerometer (acceleration sensor) 107 for detecting acceleration in three axial directions of the camera 101. Based on the signals detected by these sensors, the rotation angle of the apparatus, the shift amount of the apparatus, and the like are calculated. The accelerometer 108 disposed in the barrel 102 detects acceleration of the barrel 102.

An audio input unit 213 acquires a signal for sound around the camera 101 by a microphone provided in the camera 101, converts the sound signal into a digital audio signal, and transmits the digital audio signal to an audio processing unit 214. The audio processing unit 214 performs audio-related processing, such as processing for optimizing the input digital audio signal. The audio signal processed by the audio processing unit 214 is transmitted to the memory 215 by the first control unit 223. The memory 215 temporarily stores the image signal and the audio signal obtained by the image processing unit 207 and the audio processing unit 214.

The image processing unit 207 and the audio processing unit 214 read out the image signal and the audio signal temporarily stored in the memory 215, encode the image signal and the audio signal, and generate a compressed image signal and a compressed audio signal. The first control unit 223 transmits the compressed image signal and the compressed audio signal to a recording/reproducing unit 220.

The recording/reproducing unit 220 records, on a recording medium 221, the compressed image signal, the compressed audio signal, other control data relating to imaging, and the like generated by the image processing unit 207 and the audio processing unit 214. When the audio signal is not compressed and encoded, the first control unit 223 transmits the audio signal generated by the audio processing unit 214 and the compressed image signal generated by the image processing unit 207 to the recording/reproducing unit 220 to thereby record them on the recording medium 221.

The recording medium 221 may be a recording medium built into the camera 101 or a removable recording medium, and can record various data such as a compressed image signal, a compressed audio signal, and an audio signal generated by the camera 101. Generally, a medium having a capacity larger than that of the nonvolatile memory 216 is used as the recording medium 221. For example, the recording medium 221 includes any type of recording medium such as a hard disk, an optical disk, a magneto-optical disk, a CD-R, a DVD-R, a magnetic tape, a nonvolatile semiconductor memory, and a flash memory.

The recording/reproducing unit 220 reads out (reproduces) a compressed image signal, a compressed audio signal, an audio signal, various data, and a program recorded on the recording medium 221. Then, the first control unit 223 transmits the read compressed image signal and compressed audio signal to the image processing unit 207 and the audio processing unit 214. The image processing unit 207 and the audio processing unit 214 temporarily store the compressed image signal and the compressed audio signal in the memory 215, decode them in predetermined procedures, and transmit the decoded signals to the video output unit 217.

A plurality of microphones are arranged in the audio input unit 213, and the audio processing unit 214 can detect the direction of audio with respect to a plane on which the plurality of microphones are arranged, and is used for searching for a subject or for automatic imaging, which will be described later. Further, the audio processing unit 214 detects a specific audio command. The audio command may be configured such that the user can register specific audio in the camera in addition to some commands registered in advance. Also, audio scene recognition is performed. In audio scene recognition, an audio scene is determined by a network learned by machine learning based on a large amount of audio data in advance. For example, a network for detecting a specific scene such as "cheering", "clapping", "speaking" or the like is set in the audio processing unit 214, and a specific audio scene or a specific audio command is detected. When the audio processing unit 214 detects a specific audio scene or a specific audio command, it outputs a detection trigger signal to the first control unit 223 or a second control unit 211.

In addition to the first control unit 223 for controlling the entire main system of the camera 101, the second control unit 211 for controlling the power supply of the first control unit 223 is provided. A first power supply unit 210 and a second power supply unit 212 supply electric power for operating the first control unit 223 and the second control unit 211, respectively. When the power button provided in the camera 101 is pressed, power is first supplied to both the first control unit 223 and the second control unit 211, but when the power button is pressed again, the first control unit 223 controls the first power supply unit 210 and the second control unit 211 controls the second power supply unit 212 to turn off their respective power supplies. When the power button is pressed again, the first power supply unit 210 supplies power to the first control unit 223, and the second power supply unit 212 supplies power to the second control unit 211, whereby the camera 101 shifts from a power-off state to a power-on state.

When a sleep button provided on the camera 101 is pressed, the first control unit 223 controls the first power supply unit 210 to turn off its power supply. When the sleep button is pressed again, the first power supply unit 210 supplies power to the first control unit 223, whereby the camera 101 shifts from the sleep state to the power-on state. In the sleep state, while the first control unit 223 is not operating, the second control unit 211 is operating, and information from the device shake detection unit 209 and the audio processing unit 214 is input. The second control unit 211 determines whether or not to activate the first control unit 223 based on various input information, and when activation is determined, instructs the first power supply unit 210 to supply power to the first control unit 223. In this manner, it is also possible to shift from the sleep state to the power-on state without the user pressing the sleep button.

An audio output unit 218 outputs a preset audio pattern from a speaker incorporated in the camera 101, for example, at the time of imaging. An LED control unit 224 turns on an LED provided in the camera 101 based on a preset lighting pattern or a flashing pattern, for example, at the time of imaging. The video output unit 217 includes, for example, a video output terminal, and outputs an image signal for displaying a video on a connected external display or the like. The audio output unit 218 and the video output unit 217 may be connected to one terminal, for example, an HDMI (registered trademark: High-Definition Multimedia Interface) terminal.

A communication unit 222 is a unit that performs communication between the camera 101 and an external device, and transmits and receives data such as an audio signal, an image signal, a compressed audio signal, and a compressed image signal, for example. Further, the camera 101 is driven on the basis of an instruction from an external device by receiving a control signal relating to imaging such as a command for starting or ending imaging, pan/tilt and zoom driving, or the like. Information such as various parameters related to learning processed by a learning processing unit 219 is transmitted and received between the camera 101 and an external device. The communication unit 222 includes, for example, a radio communication module such as an infrared communication module, a Bluetooth (registered trademark) communication module, a wireless LAN communication module, a Wireless USB (registered trademark), or a GPS receiver.

A subject detection unit 225 detects a subject from the image signal processed by the image processing unit 207 by a known method.

<Communication with External Devices>

Figure 3:
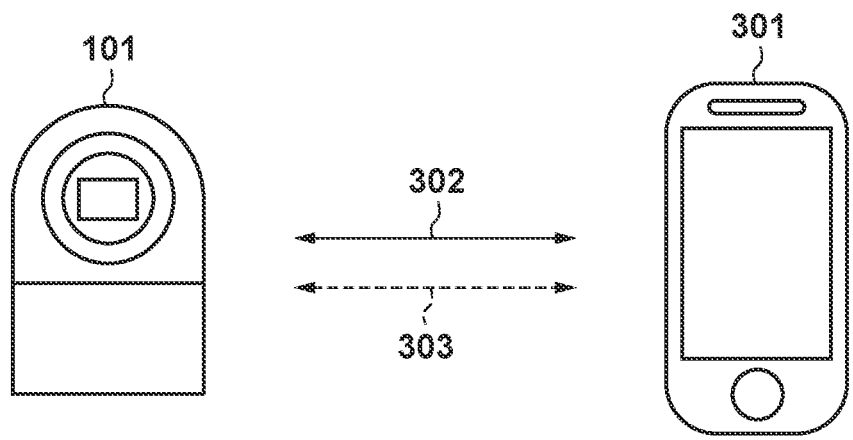
FIG. 3 is a view that illustrates an example of a configuration of a wireless communication system of the camera and an external device.

FIG. 3 is a view showing an example of the arrangement of a wireless communication system between the camera 101 and an external device 301. The camera 101 is a digital camera having an imaging function, and the external device 301 is a smart device including a Bluetooth communication module and a wireless LAN communication module.

The camera 101 and the external device 301 can communicate with each other through a first communication 302 using a wireless LAN based on, for example, the IEEE 802.11 standard series, and a second communication 303 having a master-slave relationship, such as a control station and a dependent station, for example, such as with Bluetooth Low Energy (hereinafter referred to as "BLE"). It should be noted that wireless LAN and BLE are examples of communication methods, and each communication device has two or more communication functions, and other communication methods may be used as long as it possible to, by one communication function for performing communication in the relationship between the control station and the dependent station, control the other communication function, for example. However, it is assumed that at least either the first communication 302, which may be wireless LAN, is higher-speed communication than the second communication 303, which may be BLE, or the second communication 303 consumes less power than the first communication 302 and/or has a shorter communicable distance.

Figure 4:
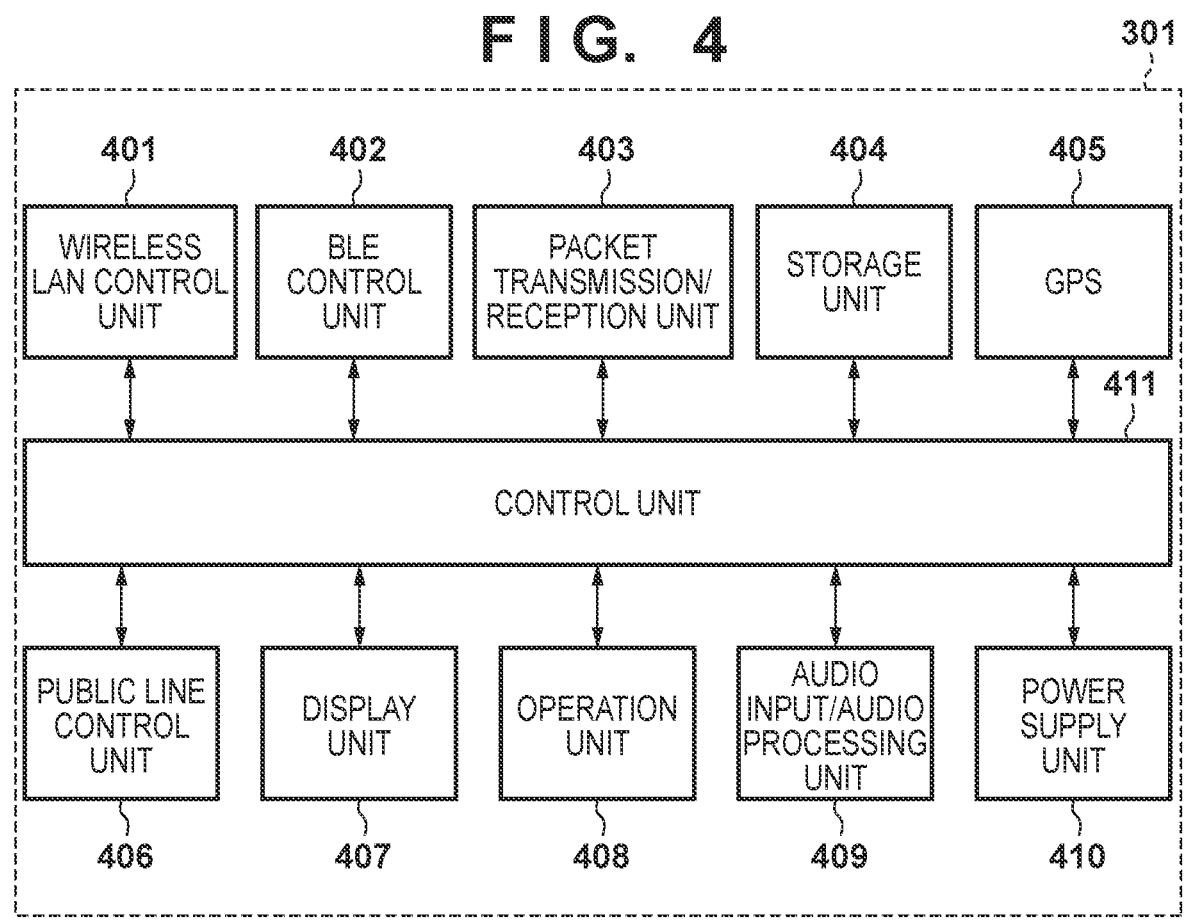
FIG. 4 is a view that illustrates a configuration of the external device.

The configuration of the external device 301 will be described with reference to FIG. 4. The external device 301 includes, for example, a wireless LAN control unit 401 for wireless LAN, a BLE control unit 402 for BLE, and a public line control unit 406 for public wireless communication. The external device 301 further includes a packet transmission/reception unit 403. The wireless LAN control unit 401 performs RF control of the wireless LAN, communication processing, driver processing for performing various controls of communication by the wireless LAN in accordance with the IEEE 802.11 standard series, and protocol processing for communication by the wireless LAN. The BLE control unit 402 performs RF control of BLE, communication processing, driver processing for performing various controls of communication by BLE, and protocol processing related to communication by BLE. The public line control unit 406 performs driver processing for performing RF control of public wireless communication, communication processing, and various controls of public wireless communication, and performs protocol processing related to public wireless communication. The public wireless communication is based on, for example, the IMT (International Multimedia Telecommunications) standard, the LTE (Long Term Evolution) standard, or the like. The packet transmission/reception unit 403 performs processing for performing at least one of transmission and reception of packets related to communication by wireless LAN and BLE and public wireless communication. In the present embodiment, the external device 301 is described as performing at least one of transmission and reception of packets in communication, but other communication formats, such as circuit switching, may be used instead of packet switching.

The external device 301 further includes, for example, a control unit 411, a storage unit 404, a GPS receiving unit 405, a display unit 407, an operation unit 408, an audio input/audio processing unit 409, and a power supply unit 410. The control unit 411 controls the entire external device 301, for example, by executing a control program stored in the storage unit 404. The storage unit 404 stores, for example, a control program executed by the control unit 411 and various information such as parameters necessary for communication. Various operations to be described later are realized by the control unit 411 executing a control program stored in the storage unit 404.

The power supply unit 410 supplies power to the external device 301. The display unit 407 has a function capable of outputting visually recognizable information as with an LCD or an LED, or outputting audio as with a speaker, and displays various types of information. The operation unit 408 includes, for example, a button for accepting an operation of the external device 301 by the user. The display unit 407 and the operation unit 408 may be formed in a common member such as a touch panel, for example.

The audio input/audio processing unit 409 may be configured to input sounds made by a user by a general-purpose microphone built into the external device 301, for example, and to identify an operation command of the user by audio recognition processing. In addition, an audio command can be acquired upon a user's utterance using a dedicated application in the external device 301, and registered as a specific audio command to be recognized by the audio processing unit 214 of the camera 101 via the first communication 302 through the wireless LAN.

The GPS (Global positioning system) receiving unit 405 receives GPS signals notified from satellites, analyzes the GPS signals, and estimates the current position (longitude/latitude information) of the external device 301. Alternatively, the current position of the external device 301 may be estimated on the basis of information of a radio network existing in the vicinity by using WPS (Wi-Fi Positioning System) or the like. When the acquired current GPS position information is located in a position range set in advance (within a range of a predetermined radius with the detection position as the center), or when there is a position change of a predetermined value or more in the GPS position information, the movement information is notified to the camera 101 via the BLE control unit 402. Then, that is used as a parameter for automatic imaging or automatic editing.

As described above, the camera 101 and the external device 301 exchange data by communication using the wireless LAN control unit 401 and the BLE control unit 402. For example, data such as an audio signal, an image signal, a compressed audio signal, and a compressed image signal is transmitted and received. In addition, an imaging instruction or the like is transmitted from the external device 301 to the camera 101, audio command registration data is transmitted, a predetermined position detection notification based on GPS position information is transmitted, a position movement notification is transmitted, and the like. In addition, learning data is transmitted and received using a dedicated application in the external device 301.

<Operation Control for Non-Imaging State Indication>

FIG. 5 is a flowchart illustrating an example of control performed by the first control unit 223 of the camera 101 in the present embodiment for clearly indicating a non-imaging state. The control of this flowchart is started from a state in which the camera 101 is operated in a normal imaging state.

First, in step S501, when it is detected that the user (the user of the camera 101) presses the power button or presses the sleep button, it is determined that the user intends to shift the camera 101 to the non-imaging state, and the operation of the present flowchart is started.

In step S502, the way in which the user holds the camera 101 is determined. Details of the determination method will be described later.

In step S503, a direction to which to rotate the barrel 102 such that it can be visually recognized that the direction of the imaging optical axis of the camera 101 was changed is determined in accordance with the way in which the camera is held which is determined in step S502.

FIG. 6 is a view that illustrates a first rotational direction of the barrel for each of respective ways in which the camera is held. When, in step S502, it is determined that the camera 101 is currently being held in a hand-held state, it is determined that the barrel 102 is to be rotated to a floor direction (a direction of the ground or a downwards direction). Similarly, when it is determined that the user is not actually holding the camera but rather the camera is in a so-called set-and-shoot state in which an image is taken by placing the camera on a base, a shelf, or the like, it is determined that rotation of the barrel 102 to an overhead direction (a direction of the sky or an upward direction) is to be performed. Similarly, when it is determined to be in a neck-strap-held state, it is determined that the barrel 102 of the camera 101 is to be rotated to a direction towards the user's body.

In step S504, the barrel 102 is rotated by the barrel rotation driving unit 205 to the direction determined in step S503. When the direction to which to rotate is the floor direction, the barrel rotation driving unit 205 causes the tilt rotation unit 104 to rotate the barrel 102 until an output value of the accelerometer 108 becomes equal to or greater than a constant N1 (N1>0). When the tilt limit angle of the barrel 102 is reached before the output value of the accelerometer 108 becomes equal to or greater than the constant N1, the barrel rotation driving unit 205 stops the rotation of the barrel 102 at the tilt limit angle.

Similarly, when the direction to which to rotate is the overhead direction, the barrel rotation driving unit 205 causes the tilt rotation unit 104 to rotate the barrel 102 until an output value of the accelerometer 108 becomes less than or equal to a constant N2 (N2<0). Note that N1 represents a value that is smaller than gravitational acceleration g and approximates gravitational acceleration g, and N2 represents a negative value whose absolute value is smaller than gravitational acceleration g and approximates gravitational acceleration g. When the tilt limit angle of the barrel 102 is reached before the output value of the accelerometer 108 becomes less than or equal to the constant N2, the barrel rotation driving unit 205 stops the rotation of the barrel 102 at the tilt limit angle.

Similarly, when the direction to which to rotate is towards the user's body, the barrel rotation driving unit 205 rotates the barrel 102 in one direction at the angular velocity S by the pan rotation unit 105. Simultaneously thereto, the first control unit 223 calculates a contrast value, a luminance value, and a depth value of the digital image data obtained from the image processing unit 207, and determines whether or not the barrel 102 is currently oriented toward the user's body. More specifically, when the contrast value is equal to or less than a constant NC, the luminance value is equal to or less than a constant NB, and the depth value is equal to or less than a constant ND, it is considered that the body of the photographer has been detected (human body detection), and it is determined that the barrel is currently oriented toward the user's body.

When it is determined that the barrel is facing the direction of the user's body, the barrel rotation driving unit 205 stops the rotation of the barrel 102 by the pan rotation unit 105. When it is determined that the barrel is not facing the direction of the user's body, the barrel rotation driving unit 205 continues the rotation of the barrel 102 by the pan rotation unit 105 at the angular velocity S. When the pan limit angle of the barrel 102 is reached before it is determined that the direction is the direction of the user's body, the barrel rotation driving unit 205 performs, by the pan rotation unit 105, pan driving in a direction opposite to the direction thus far. When the pan limit angle of the barrel 102 is reached again, the barrel rotation driving unit 205 stops the rotation of the barrel 102 at the pan limit angle.

In step S505, the digital image data obtained from the image processing unit 207 is sent to the subject detection unit 225, and the subject detection unit 225 performs subject detection processing. If, as a result of subject detection, any face or body or conspicuous object is detected as the subject, the process proceeds to step S506. When a subject is not detected, the process proceeds to step S508. The conspicuous object may be, for example, an object having a relatively high color saturation or high luminance in the digital image data.

In step S506, the direction to which the barrel 102 is rotated is determined again in accordance with the way in which the camera is held which is determined in step S502.

FIG. 7 is a view that illustrates a second rotational direction of the barrel for each of respective ways in which the camera is held. In step S502, when it is determined that the camera 101 is currently being held by the user in the hand-held state, it is determined that the barrel 102 is to be rotated to the overhead direction. Similarly, when it is determined that the user is not actually holding the camera but rather the camera is in a so-called a set-and-shoot state in which an image is taken by placing the camera on a base, a shelf, or the like, it is determined that the rotation of the barrel 102 to the floor direction is to be performed. Similarly, when it is determined to be in the neck-strap-held state, it is determined that the rotation of the barrel 102 to the floor direction is to be carried out.

In step S507, the user is warned that a subject is present. The warning content includes, for example, audio output such as a buzzer or a vibration by the audio output unit 218, a message output by the video output unit 217, LED blinking by the LED control unit 224, or the like. These warnings may be stopped after a predetermined period of time has elapsed, or may be stopped by a predetermined user operation. In step S507, the user can manually rotate the barrel 102. After the warning stops, the process returns to step S504, and the barrel rotation driving unit 205 rotates the barrel 102 in the direction determined in step S506. In step S505, it is determined again whether or not a subject is not detected, and steps S504-S507 are repeated until a subject is not detected. In order to prevent the warning from being repeated so long as a subject exists, configuration may be taken to advance to step S508 even if a subject is detected in step S505 if steps S504-S507 are repeated a predetermined number of times.

In step S508, when the user performs an operation for shifting to the sleep state in step S501, the first control unit 223 instructs the first power supply unit 210 to turn off the power supply. In the case of the sleep state, the barrel rotation driving unit 205 fixes the barrel 102 in the current direction until a change by which the power-on state is returned to. Meanwhile, if the user has performed an operation for shifting to a power off state in step S501, the first control unit 223 instructs the first power supply unit 210 to turn off the power supply. In addition, the second control unit 211 instructs the second power supply unit 212 to turn off the power supply.

Through the above-described operation, when the user turns off the power of the camera 101 or switches to the sleep state, the direction of the optical axis for imaging of the barrel 102 can be changed to a direction that visually indicates the non-imaging state. Thus, it is possible to clearly indicate to people in the vicinity that the camera 101 is in the non-imaging state.

Although not directly related to the flowchart of FIG. 5, the external appearance of the barrel 102 may be given a color scheme different to that of the fixed portion 103 in order to clearly indicate that the direction in which the barrel 102 is directed to people in the vicinity.

Next, with reference to FIG. 8, the determination of the way in which the camera 101 is held in step S502 will be described in detail. FIG. 8 is a flowchart illustrating an operation performed by the first control unit 223 and that is for determining the way in which the camera 101 is held.

In step S801, it is determined whether or not the output value of the accelerometer 107 is equal to or greater than a constant G1 (G1>0). The constant G1 is a value that is smaller than gravitational acceleration g and that approximates gravitational acceleration g. When an output value of the accelerometer 107 is greater than or equal to the constant G1, it is determined that the user is holding the camera 101 in a neck-strap-held state. When the output value of the accelerometer 107 is less than the constant G1, the process proceeds to step S802.

In step S802, when the output value of the accelerometer 107 is equal to or greater than the constant G2 and less than the constant G3 (G2<G3<G1), the camera 101 is determined to be in the set-and-shoot state. Since the output of the accelerometer 107 is approximately 0 in the set-and-shoot state, the values of G2 and G3 are close to 0. If neither the determination in step S801 nor the determination in step S802 is YES, it is determined that the user is holding the camera in the hand-held state.

<Clearly Indicating a Non-Imaging State in the Power-On State>

FIG. 9 is a flowchart illustrating an example of control performed by the first control unit 223 of the camera 101 to clearly indicate the non-imaging state while the power supply remains in the operating state. Since the control is generally similar to that of FIG. 5, only parts that are different will be described below.

First, in step S901, when an operation for clearly indicating the non-imaging state by the user is detected, it is determined that the user intends to shift the camera 101 to the non-imaging state, and the operation of the present flowchart is started. The operation for clearly indicating the non-imaging state by the user may be, for example, audio input via the audio input unit 213, manual rotation of the barrel 102 in a predetermined direction by the user himself/ herself, or detection of transition of output values of the accelerometer 108. In this flowchart, the process for turning off the power or going to sleep as in step S508 is not performed.

<Control when an Imaging-Forbidden Area is Detected>

Figure 10:
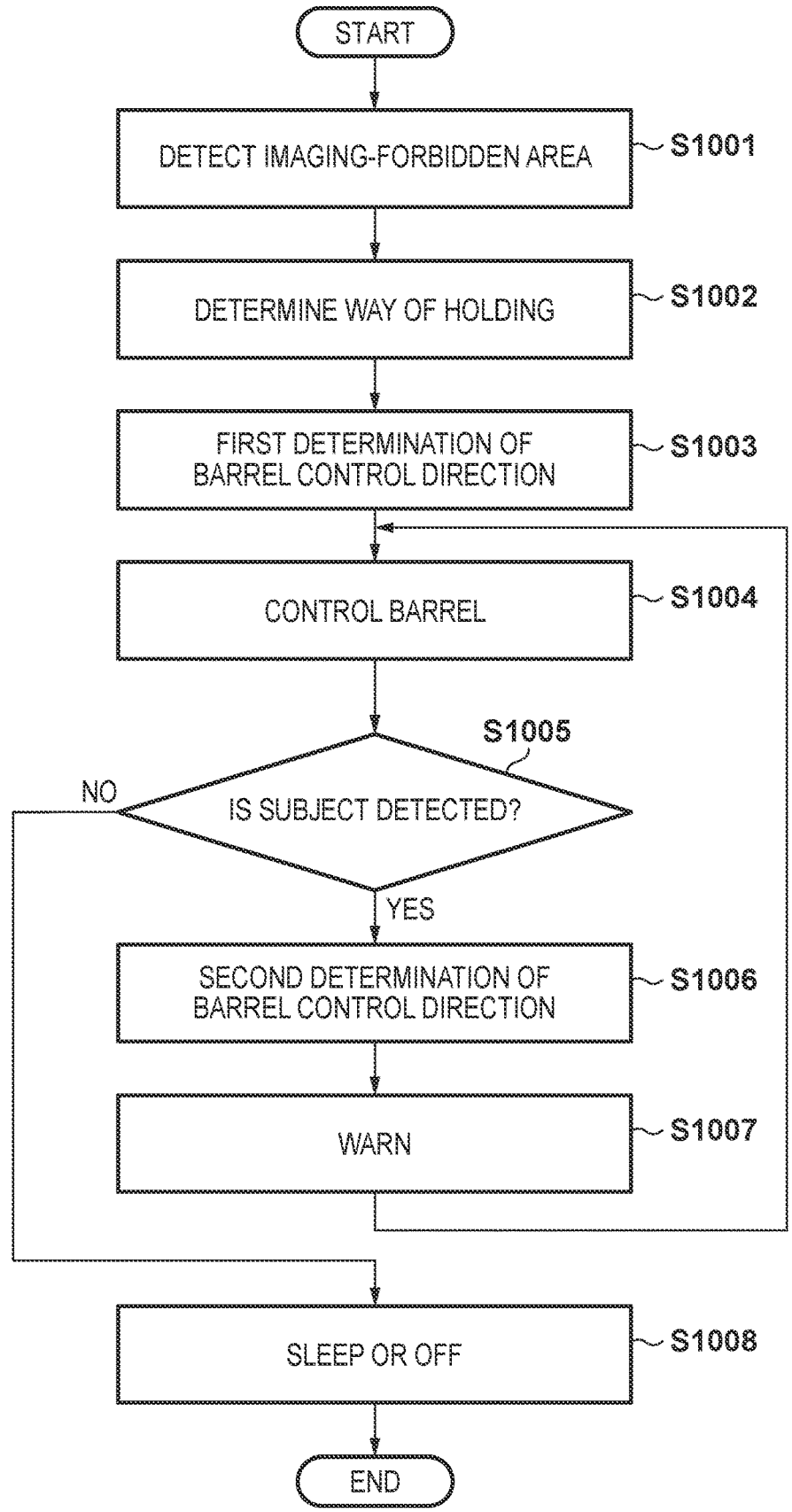
FIG. 10 is a flowchart for describing an example of control for indicating the non-imaging state.

FIG. 10 is a flowchart illustrating an example of control for clearly indicating that the camera 101 has shifted to the non-imaging state when the external device 301 detects an imaging-forbidden area. Since the control is generally similar to that of FIG. 5, only parts that are different will be described below.

First, in step S1001, when it is detected that by the communication between the communication unit 222 and the external device 301, the external device 301 is currently present in a building or area where imaging is prohibited, it is determined that the camera 101 needs to be shifted to a non-imaging state. Then, the operation of this flowchart is started.

Here, a method for detecting whether or not the external device 301 is present in a building or an area in which imaging is prohibited will be described. The GPS receiving unit 405 of the external device 301 analyzes a GPS signal after receiving it, and estimates the current position (longitude/latitude information) of the external device 301. Then, the control unit 411 determines whether or not the external device 301 is in a building or an area in which imaging is prohibited, based on two pieces of information, that is, map information stored in the storage unit 404 in advance and current position information of the external device 301.

Note that the above-mentioned control can be made non-executable by a user operation. That is, the camera 101 can be set not to execute the control to clearly indicate the non-imaging state even if the external device 301 detects an imaging-forbidden area. Alternatively, the detection itself of the imaging-forbidden area by the external device 301 can be set to not be executed.

<Variation of Second Determination of Barrel Control Direction>

Referring to FIG. 11, an exemplary control of the barrel which differs from the process of steps S504-S506 of FIG. 5 will be described. FIG. 11 is a view illustrating a variation of the second determination of the barrel control direction, which differs from that of FIG. 5.

In step S506, when the way in which the camera is held which is determined in step S502 is hand-held or set-and-shoot, the process returns to step S504, and the barrel 102 is pan-driven in the positive direction at the angular velocity S and the process proceeds to step S505 after a predetermined time period elapsed. When the way in which the camera is held determined in step S502 is neck-strap-held, the process returns to step S504, the barrel rotation driving unit 205 drives the barrel 102 to the floor direction by the tilt rotation unit 104, and then pans the barrel 102 in the positive direction at the angular velocity S and the process proceeds to step S505 after a predetermined time period elapsed. When the pan limit angle of the barrel 102 is reached again, the barrel rotation driving unit 205 stops the rotation of the barrel 102.

When a subject is detected again in step S505 and the pan limit angle in the positive direction is not reached in the previous step S506, the process returns to step S504 again, and the operation of pan-driving the barrel 102 in the positive direction at the angular velocity S is continued. On the other hand, when a subject is detected again in step S505 and the pan limit angle in the positive direction is reached in the previous step S506, the process returns to step S504, and an operation of pan-driving the barrel 102 this time in the negative direction at the angular velocity S is performed. Then, the processing proceeds to step S505 again after a predetermined time period elapsed.

If the pan limit angle is reached in both the positive and negative directions in step S506 and a subject is still detected in step S505, the processing proceeds from step S506 to step S507, and a warning is issued.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-167215, filed Sep. 6, 2018, which is hereby incorporated by reference herein in its entirety.

What is claimed is:

1. An imaging apparatus comprising:
at least one processor or circuit configured to function as a plurality of units comprising:
(1) a change unit configured to, such that it is possible to visually recognize that a direction of an optical axis for imaging has been changed, change the direction of the optical axis for imaging;
(2) an instruction unit configured to give an instruction to shift to a non-imaging state;
(3) a control unit configured to, in a case where the instruction unit gave the instruction to shift to the non-imaging state, control the change unit so as to change the direction of the optical axis for imaging to a direction that visually indicates the non-imaging state; and
(4) a determination unit configured to determine a way in which the imaging apparatus is held,
wherein the control unit changes the direction that visually indicates the non-imaging state in accordance with the way in which the imaging apparatus is held.

2. The imaging apparatus according to claim 1, wherein the determination unit determines whether the way in which the imaging apparatus is held corresponds to a hand-held state, a neck-strap-held state, or a set-and-shoot state.

3. The imaging apparatus according to claim 2, wherein, in a case where it is determined by the determination unit that the way in which the imaging apparatus is held corresponds to the hand-held state, the control unit sets the direction that visually indicates the non-imaging state to a direction in which the optical axis for imaging is directed downward.

4. The imaging apparatus according to claim 3, wherein the at least one processor or circuit is configured to further function as an acceleration detection unit configured to detect an acceleration relating to a direction of the optical axis for imaging, and
wherein the direction that visually indicates the non-imaging state is a direction in which the absolute value of the acceleration detected by the acceleration detection unit is a value that is smaller than gravitational acceleration and that is close to gravitational acceleration.

5. The imaging apparatus according to claim 2, wherein, in a case where it is determined by the determination unit that the way in which the imaging apparatus is held corresponds to the set-and-shoot state, the control unit sets the direction that visually indicates the non-imaging state to a direction in which the optical axis for imaging is directed upward.

6. The imaging apparatus according to claim 2, wherein the at least one processor or circuit is configured to further function as a human body detection unit configured to detect a body of a user of the imaging apparatus, and
wherein in a case where it is determined by the determination unit that the way in which the imaging apparatus is held corresponds to the neck-strap-held state, the control unit sets the direction that visually indicates the non-imaging state to a direction in which the optical axis for imaging is directed toward the body of the user detected by the human body detection unit.

7. The imaging apparatus according to claim 6, wherein the human body detection unit detects a direction in which the body of the user of the imaging apparatus exists, based on at least one of a contrast value, a luminance value, and a depth value of an image obtained by a capturing unit.

8. The imaging apparatus according to claim 1, wherein the at least one processor or circuit is configured to further function as an acceleration detection unit configured to detect an acceleration of the imaging apparatus, and
wherein the determination unit determines the way in which the imaging apparatus is held based on an output of the acceleration detection unit.

9. The imaging apparatus according to claim 1, wherein the at least one processor or circuit is configured to further function as a communication unit configured to communicate with an external device, and
wherein the instruction unit shifts the imaging apparatus to the non-imaging state in a case where the communication unit receives that imaging is prohibited.

10. The imaging apparatus according to claim 1, wherein the instruction unit further brings about turning off a power source of the imaging apparatus.

11. The imaging apparatus according to claim 10, wherein the instruction unit turns off the power source of the imaging apparatus in response to a power button being pressed.

12. The imaging apparatus according to claim 1, wherein the instruction unit further brings about causing a power of the imaging apparatus to shift to a sleep state.

13. The imaging apparatus according to claim 12, wherein the instruction unit causes the power of the imaging apparatus to shift to the sleep state in response to a sleep button being pressed.

14. An imaging apparatus comprising:
at least one processor or circuit configured to function as a plurality of units comprising:
(1) a change unit configured to change a direction of the optical axis for imaging;
(2) an instruction unit configured to give an instruction to shift to a non-imaging state;
(3) a subject detection unit configured to detect a subject; and
(4) a control unit configured to, in a case where the instruction unit gave the instruction to shift to the non-imaging state, control the change unit so as to change the direction of the optical axis for imaging to a direction in which the subject detected by the subject detection unit is not present.

15. The imaging apparatus according to claim 14, wherein the subject detection unit detects at least one of a face, a human body, and a conspicuous object.

16. A method for controlling an imaging apparatus that comprises at least one processor or circuit configured to function as a change unit configured to, such that it is possible to visually recognize that a direction of an optical axis for imaging has been changed, change the direction of the optical axis for imaging, the method comprising:
giving an instruction to shift to a non-imaging state;
determining a way in which the imaging apparatus is held; and
in a case where the shift to the non-imaging state is instructed, controlling the change unit so as to change the direction of the optical axis for imaging to a direction that visually indicates the non-imaging state,
wherein in the controlling, the direction that visually indicates the non-imaging state is changed in accordance with the way in which the imaging apparatus is held.

17. A non-transitory computer-readable storage medium storing a program for causing a computer to execute each step of a method for controlling an imaging apparatus that comprises at least one processor or circuit configured to function as a change unit configured to, such that it is possible to visually recognize that a direction of an optical axis for imaging has been changed, change the direction of the optical axis for imaging, the method comprising:
giving an instruction to shift to a non-imaging state;
determining a way in which the imaging apparatus is held; and
in a case where the shift to the non-imaging state is instructed, controlling the change unit so as to change the direction of the optical axis for imaging to a direction that visually indicates the non-imaging state,
wherein in the controlling, the direction that visually indicates the non-imaging state is changed in accordance with the way in which the imaging apparatus is held.

18. A method for controlling an imaging apparatus that comprises at least one processor or circuit configured to function as a plurality of units comprising (a) a change unit configured to change a direction of the optical axis for imaging, and (b) a subject detection unit configured to detect a subject, the method comprising:

giving an instruction to shift to a non-imaging state; and
in a case where the instruction was given to shift to the non-imaging state, controlling the change unit so as to change the direction of the optical axis for imaging to a direction in which the subject detected by the subject detection unit is not present.

19. A non-transitory computer-readable storage medium storing a program for causing a computer to execute each step of a method for controlling an imaging apparatus that comprises at least one processor or circuit configured to function as a plurality of units comprising (a) a change unit configured to change a direction of the optical axis for imaging, and (b) a subject detection unit configured to detect a subject, the method comprising:
giving an instruction to shift to a non-imaging state; and
in a case where the instruction was given to shift to the non-imaging state, controlling the change unit so as to change the direction of the optical axis for imaging to a direction in which the subject detected by the subject detection unit is not present.

* * * * *